United States Patent
Wolfelsperger

[15] 3,686,822
[45] Aug. 29, 1972

[54] APPARATUS AND METHOD FOR SKIN PACKAGING

[72] Inventor: Robert O. Wolfelsperger, Fairfield, N.J.

[73] Assignee: William E. Young, Stamford, Conn.

[22] Filed: Sept. 14, 1970

[21] Appl. No.: 71,688

Related U.S. Application Data

[63] Continuation-in-part of Ser. No. 856,305, Sept. 9, 1969, abandoned.

[52] U.S. Cl. ..............................53/22 A, 53/112 A
[51] Int. Cl. ...............................................B65b 31/02
[58] Field of Search ..........................53/22 A, 112 A

[56] References Cited

UNITED STATES PATENTS

| | | | |
|---|---|---|---|
| 3,195,288 | 7/1965 | Sloan et al. | 53/112 A X |
| 3,545,163 | 12/1970 | Mahaffy et al. | 53/22 A |
| 2,991,600 | 7/1961 | Lancaster | 53/22 A |

*Primary Examiner*—Travis S. McGehee
*Attorney*—Ralph R. Roberts

[57] ABSTRACT

An apparatus and method is provided for forming a skin package particularly for food products, hardware and the like, in which said package is formed by a pressure differential applied to either an upper or lower member or both. This pressure is applied to the midportion of a film brought to a stretchable condition and held by its edges. When the film is thermoplastic this stretchable condition may be provided by holding its midportion against a heated platen until it is softened to a condition adapted for draping, sealing and forming. The product for packaging is placed on the lower covering member whose supporting face is adapted for sealing to the upper member by means of a pressure differential or air pressure and with this motion the film is stretched and brought to and is draped over the product. The air or atmosphere is used to form the package by pushing the film tightly around the product and into sealing condition with the other member. When both upper and lower members are thermoplastic film and are heated, either or both of the films after heating are urged toward each other. The chamber includes an upper and lower platen or clamping means and a mid-chamber form and may have provision for flushing the product or package with gas such as nitrogen, carbon dioxide and the like. A stretchable film may be used as one or both of the members and have an adhesive coated surface so that no heat is required but the stretchable film is pushed into sealing engagement with the other clamped member.

14 Claims, 26 Drawing Figures

INVENTOR.
ROBERT O. WOLFELSPERGER
BY
Ralph K Roberts
AGENT

INVENTOR.
ROBERT O. WOLFELSPERGER

BY
Ralph R Roberts
AGENT

INVENTOR.
ROBERT O. WOLFELSPERGE
BY
Ralph R Roberts
AGENT

INVENTOR.
ROBERT O. WOLFELSPERGER
BY
Ralph R Roberts
AGENT

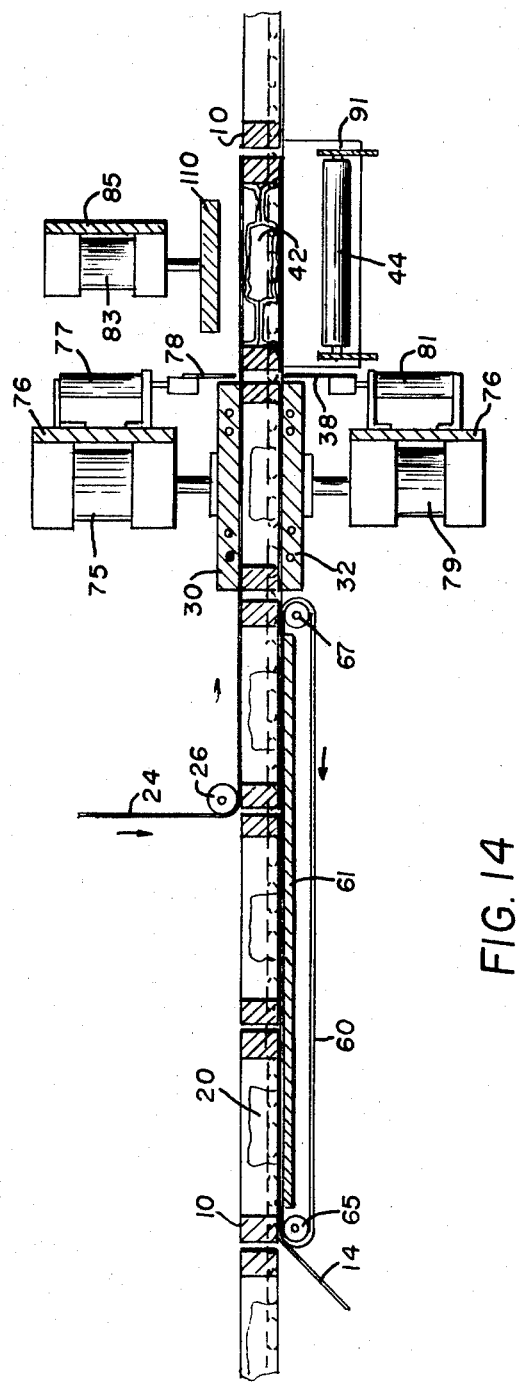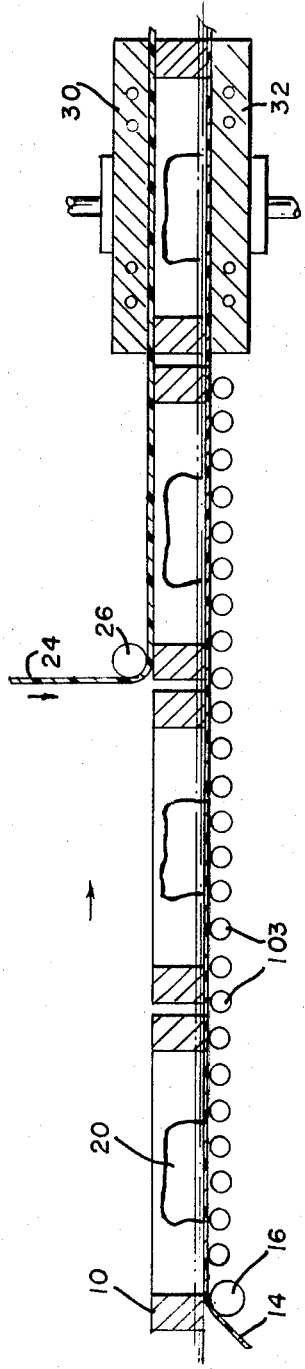

PATENTED AUG 29 1972 3,686,822

INVENTOR.
ROBERT O. WOLFELSPERGER

BY

Ralph R Roberts
AGENT

INVENTOR.
ROBERT O. WOLFELSPERGER

BY

AGENT

INVENTOR.
ROBERT O. WOLFELSPERGER
BY
AGENT

APPARATUS AND METHOD FOR SKIN PACKAGING

This application is a continuation-in-part of application Ser. No. 856,305 filed Sept. 9, 1969 and with the acceptance of this application, abandoned.

BACKGROUND OF THE INVENTION

1. Field of the Invention

In accordance with the classification of art as established in the U.S. Patent Office this invention pertains to the general class of "Package Making" and more particularly to the subclass of packages wherein the "contents are treated with vacuum or inert atmosphere." This method of packaging and the apparatus for performing the method pertains to the packaging of a product in a hermetically sealed package.

2. Description of the Prior Art

The packaging of products in thermoplastic film and with the packaged product in a condition of partial vacuum is, of course, well known in the art and the broad concept of forming a package in or with the assistance of vacuum is also well known. The problems solved by the patents directed towards the packaging of pharmaceutical products, processed sliced meats, cheeses and the like, are directed toward products which generally are of a like size and configuration and generally uniform in the composition of the product. There are, however, many problems in the packaging of dissimilar sized products such as fresh meat products, including subprimals and fowl, fish and the like. Among these problems are irregularity of size of the product, looseness of the film covering, and incomplete sealing of the package. Causing these conditions are failure of the sealing of the package at its edge or edges, preforming the film to a dimension greater than the product size, and permitting the pressure inside the package to approach or reach atmospheric pressure.

In the packaging of products where there are voids in the product which persist during and after the packaging of the product the packaging tends to remain tight to the product when the package is hermetically sealed and where the product and voids are under a negative or reduced pressure in the package. When the package interior approaches or is at atmospheric pressure, the package tends to become loose in part or may become completely loose particularly if, in the handling thereof, the package has been roughly treated.

In the skin packaging of cold meats and in both regularly and irregularly shaped items such as hardware, the packaging in the presence of vacuum usually contemplates the preforming of a blister portion in one member of the package before this member is brought to the final step of packaging. Products so packaged tend to be slightly smaller than the enclosing package hence the product is not tightly retained and often, after much handling, appears at a less than satisfactory condition. In the packaging of processed meat products, such as frankfurters and the like, it is known to extrude films so as to have a tacky or adhesive surface and to place the product on the tacky surface of one film while holding another film in spaced condition and then drawing the films to and around the product after which the package is treated to set the film. Inconsistent or irregularly sized products are not tightly packaged in the preformed film members and packages made from just-extruded film require much special equipment and additionally limit the qualities to those inherent in the extruded film.

In the present invention there is provided apparatus and method for forming a skin package in which at least one film is conditioned to stretch tightly around the product and to be sealed to the other film. Such a package accommodates irregularly shaped products including those having voids.

SUMMARY OF THE INVENTION

This invention provides a method and apparatus wherein pharmaceuticals, fresh meat, fish, irregularly shaped hardware items and the like are packaged so that the film cover portions are caused to tightly adhere to the product and where voids in the product being packaged are present they are brought to a condition of reduced pressure. The package so formed has at least one of the upper and lower members of thermoplastic or stretchable film which forms the package outer wrap. The resulting package has its inner portion under reduced pressure so that the upper and lower cover portions are tightly conformed to the shape, usually irregular, of the product being packaged.

The method of this invention contemplates that the product to be packaged is placed upon a bottom member which may be of thermoplastic film and whose upper surface is adapted for heat sealing to an upper thermoplastic film which may be an ionomer or polyethylene after which one or both the upper and lower members are brought to a determined heated condition. The upper and lower members which provide the package are disposed adjacent and between upper and lower movable platens and a facing end of a movable chamber form for the purpose of identification called a mid-chamber which is carried by a belt chain or other endless machine apparatus. Both the upper and lower platens are adapted to move into engagement with the face of one of a series of mid-chamber members to cause upper and lower films or members to be sealed within the chamber. When so sealed, the upper and lower films, if of thin thermoplastic, are caused to be moved into contact with the platens by means of a pressure differential. When the film is brought into contiguous engagement with these platens, the center portions of which are heated to a determined temperature, the film is maintained against this platen until it, the film, has reached a determined heated condition.

The product to be packaged is placed on the lower film before the chamber is closed and after closing, the product and the area between the upper and lower films is caused to be brought to a condition of reduced pressure whereupon the outer surfaces of the upper and lower films adjacent to the platens are caused to be exposed to atmospheric pressure resulting in the softened heated film portions being moved towards each other and around the product. When the warmed upper and lower films meet and are forced into engagement with each other they are caused to be sealed to each other in a heat sealed condition. After the upper and lower films have been formed around the product and have been heat sealed to each other the source of reduced pressure is shut off and the chamber is caused to be opened whereupon the packaged product is cut from the carrying web of film and then is trimmed for shipping to storage or to the customer.

When a stretchable film is used, an open frame may provide the means to clamp the film to the facing end of the mid-chamber. A self-stick adhesive is provided on the facing surface of one or both of the upper and lower members. Differential pressure, as by vacuum and/or light air pressure, is applied to one or both films so that the films are formed around the product with the interior of the sealed package at reduced pressure.

There has been chosen a specific embodiment of apparatus for producing the package of this invention as well as alternate platen configurations for use with this apparatus for producing the package and showing a preferred method for packaging a product having irregular shapes and often voids. This specific embodiment and alternates thereof have been chosen for the purposes of illustration and description as shown in the accompanying drawings wherein:

BRIEF DESCRIPTION OF THE DRAWINGS

FIG. 14 represents, in an enlarged scale, a sectional view showing an arrangement of feeding an upper and a lower film to the vacuum forming operation and the cutting and severing mechanism;

FIG. 15 represents in a slightly larger scale a fragmentary sectional view showing a roller conveyor system for transporting the lower film member;

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of this invention and that the invention may be incorporated in other structural forms than shown.

DESCRIPTION OF THE APPARATUS OF FIG. 1

Figure 1:
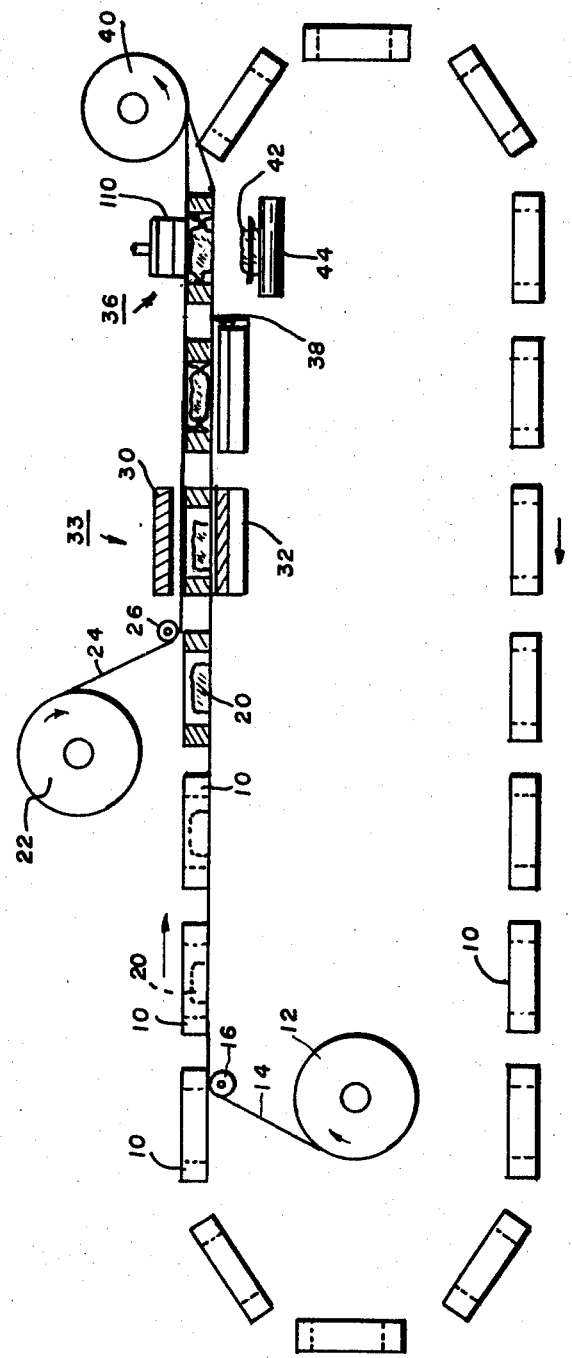
FIG. 1 represents a diagrammatic side view showing the arrangement of the apparatus for producing the package of this invention.

Referring now in particular to FIG. 1 there is shown a diagrammatic representation of a preferred apparatus for forming a package by a preferred method of this invention. In this apparatus an endless chain, to be hereinafter shown and described in conjunction with FIG. 13, carries a series of mid-chamber forms 10 which are contemplated to be of like construction and configuration. Whether carried by roller chains and sprockets or other means, these mid-chamber forms in their advancement may be moved either in an intermittent or continuous manner. Each of the mid-chamber forms is contemplated as having its upper and lower end surfaces made with a smoothness or gasket means which is compatible to engage and seal a thin web of film when said film web is brought into engagement with either an upper or lower platen.

From a supply roll 12 a lower thermoplastic film strip 14 is brought toward and in way of the lower surface of the mid-chamber forms 10. After passing over an idler roll 16 a product 20 is placed on the advancing lower film 14 and within a mid- chamber form 10. The product 20, after being placed within a selected mid-form, is moved rightwardly with the mid-form and the movement of the lower film 14 at a determined speed and by means to be hereinafter more completely shown and described. From a supply roll 22 a strip of upper film 24 is fed to a guide roll 26 whereupon the upper film is brought into substantially contiguous engagement with the upper surface of an advancing mid-chamber form 10.

Upper and lower platens generally indicated as 30 and 32 are then brought toward and into engagement with the films and ends of the mid-form 10 to cause a sealing of the chamber at station 33 to be made with portions of the lower and upper films 14 and 24 caused to be trapped and sealed within the chamber. After the product has been packaged, the upper and lower platens are moved from the mid-form which with the sealed product is then advanced to station 36 whereat a trimming operation is performed to remove the packaged product and a portion of heat sealed upper and lower surrounding film from the lower and upper carrier webs 14 and 24. The lower web is then severed as by a knife 38 so that the remaining web portions may be wound up as scrap on an accumulating roll 40. The packaged product 42 may then be transported on a carrier 44 to other trimming or packaging operations.

Figure 2:
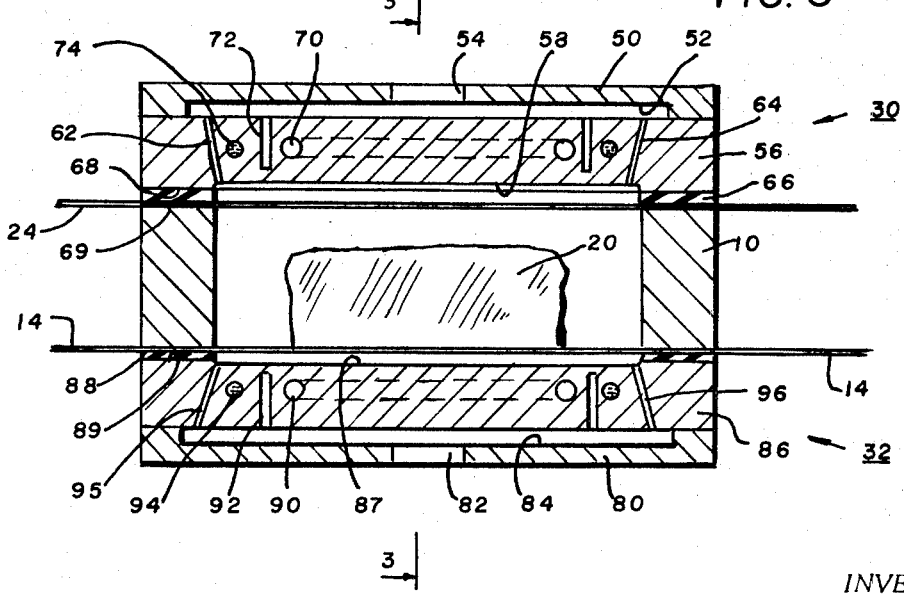
FIG. 2 represents, in an enlarged scale, a sectional view showing the several components as they are assembled to provide a chamber or forming a package about or around the product.

As shown in FIG. 2, the upper and lower platens 30 and 32 are contemplated as being constructed in a substantially identical manner. Upper platen 30 includes an upper or outer plate 50 which is contoured to provide a recess 52 on its underside portion. Through the middle of the plate is formed a port or passageway 54 which is selectively connected to a vacuum source and to the atmosphere by a valve not shown. A generally flat platen 56 having a slight recess 58 formed in the midportion of its undersurface is attached to outer plate 50. A plurality of vacuum ports 62 and 64 are formed in platen 56 and are disposed to communicate from recess 58 to recess 52. This recess 52, when plate 50 is attached to the upper surface of platen 56, forms a chamber providing a manifold for the passage of air or gas to and through passageway 54. A gasket 66 is attached to the outer downwardly facing rim portion 68 of the platen 56 so as to provide a resilient surface to compensate for any small irregularities in film thickness or surface construction of the upper face 69 of the mid-chamber form.

Within the upper platen 56 there is provided a heating element or passageway 70 which, by means of an electric current or hot fluid, steam, etc., heat is supplied to the mid-portion of the platen 56 to bring and maintain this portion at a determined temperature. An air gap 72 may be formed in the upper face of platen 56 so as to provide means for reducing the transmission of heat from the inner portion of the platen to the adjacent outer portion of the platen. When desired, the outer portion may be cooled by means of a water conducting means 74. The use and need of this differential temperature arrangement on the inner surface portion of the platen 56 is more fully explained hereinafter.

Still referring to FIG. 2 the lower platen 32 is shown as constructed in a manner substantially identical to the upper platen 30. Lower platen 32 includes a lower or outer plate 80 having a port or passageway 82 communicating with a recess 84 formed in the upper surface of the plate 80. A platen 86 may have a shallow recess 87 formed in its upper surface and adjacent this recess a gasket 88 is attached to rim 89 of the platen 86. The platen carries a heating means 90 disposed to heat the inner portion of the platen in the manner of plate 56 above. An air gap 92 formed in platen 86, like air gap 72, may be used so as to provide means for reducing the transmission of heat from inner to outer portions of the platen. This outer portion may also be additionally cooled by water fed through conductor 94. Passageways and/or ports 95 and 96 provide communication for vacuum and/or air from recess 84 to recess or surface 87 of the lower platen 32. Upper film 24 and lower film 14 are shown in position and in a clamped condition to mid-chamber form 10 and product 20 is shown as lying upon the lower film 14.

Figure 3:
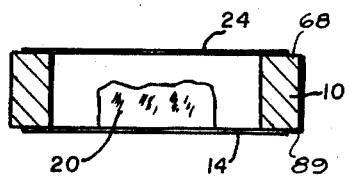
FIG. 3 represents, in a reduced scale, a diagrammatic sectional view showing the arrangement of the product on the lower film and with the films adjacent the end surface of the mid-chamber portion, the view being taken transversely of the path of the apparatus.

Referring next to FIG. 3, the mid-chamber form 10 is shown as wider than the upper and lower films 24 and 14. If desired, these films may be made wider than the mid-chamber form 10. It is noted that, as shown, the upper and lower webs 24 and 14 completely cover the opening in the mid-chamber form 10. The mid-chamber form becomes a chamber when the upper film 24 and lower film 14 are clamped to the upper and lower rim portions of the mid-chamber form. The product 20 which is to be packaged is shown as positioned in this chamber and carried on the lower film 14.

Figure 4:
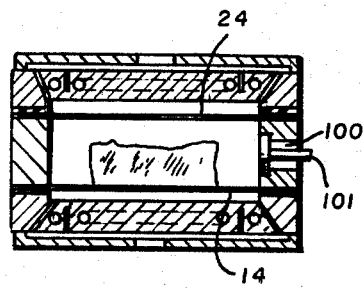
FIG. 4 represents a cross sectional view longitudinal of the apparatus and with the film and product in the closed chamber prior to the warming of the film.
Figure 19:
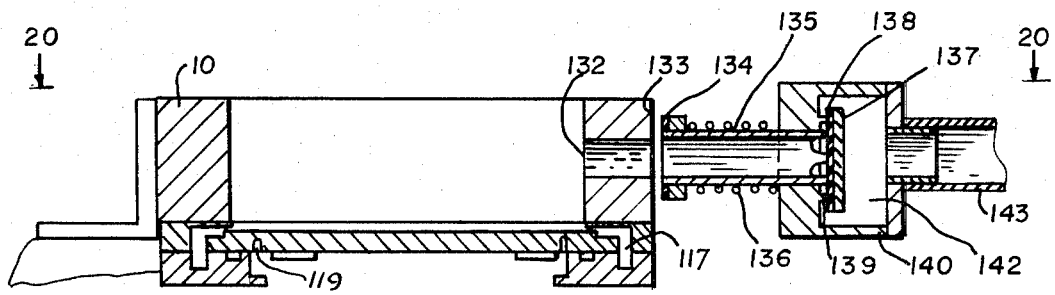
FIG. 19 represents a sectional view of a mid-chamber and bottom platen and showing in particular a preferred vacuum valve and connection to the mid-chamber.
Figure 20:
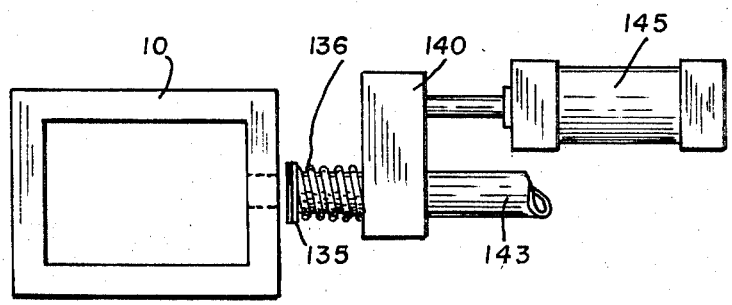
FIG. 20 represents a top view in a slightly reduced scale of the mid-chamber and vacuum connecting apparatus the view taken on the line 20—20 of FIG. 19 and looking in the direction of the arrows.

Referring next to FIG. 4, there is shown the assembled chamber of FIG. 2 wherein is also shown a vacuum communicating means for bringing a source of vacuum, gas or air into communication with the mid-chamber portion of the chamber. Between the upper and lower films 24 and 14 and through the side of a mid-chamber form 10 there is provided a passageway 100 which is opened or closed as by a poppet valve 101. This passageway may be a permanently attached tube or may be intermittently attached as the mid-chamber form 10 is brought into a determined operating condition at station 33 in the apparatus. Another valve arrangement is shown in FIGS. 19 and 20 to be hereinafter more fully described.

Figure 5:
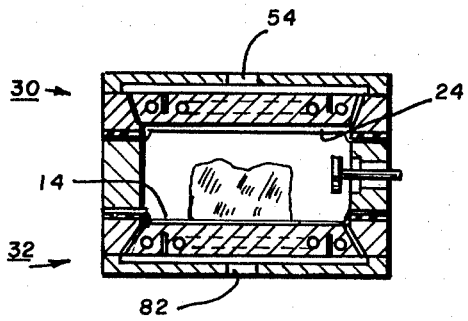
FIG. 5 represents the sealed chamber view of FIG. 4 but with the film drawn into contact with the upper and lower platens for the purposes of warming the film and with the inner chamber and the product being brought to a condition of reduced pressure.

Referring next to FIG. 5, it is contemplated that the upper and lower vacuum ports 54 and 82 are also connected to a vacuum source and when opened to this vacuum source the upper film 24 and the lower film 14 are urged against their adjacent upper and lower platens 30 and 32 by the differential of pressure. While in contact with the platens the films 24 and 14 are locally heated and softened. The heating is for a determined period of time so that each of the films is brought to a desired warmed condition by the platen and with this warmed condition being sufficient to permit draping and heat sealing of the films.

Figure 6:
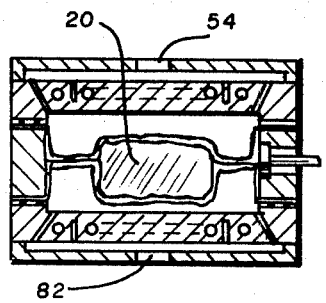
FIG. 6 represents the sectional view of the chamber of FIG. 5 with the film moved from the platens and to and around the product to form the package and with the outer sides of the films being exposed to the atmosphere to move the heated film portions around the product and into a heat sealed condition.

After this sufficient time has elapsed, the upper film may start to sag if both sides of the film are at substantially the same reduced pressure; however, the lower film remains in engagement with the internally heated portion of the lower platen and is maintained thereon by gravity until the vacuum applied through ports 54 and 82 is shut off. During the heating cycle and prior to the cutoff of the vacuum to ports 54 and 82, the vacuum supply is opened to passageway 100 so as to evacuate the mid-chamber portion between the upper and lower films and also to bring the product 20 under and to a condition of reduced pressure. After this chamber has been brought to the desired degree of reduced pressure and while the midportion is still being maintained, at reduced pressure, the upper and lower vacuum ports 54 and 82 are closed to the vacuum source and are opened to the atmosphere whereupon the upper and lower films, as seen in FIG. 6, are pushed or urged by the differential pressure towards each other to cause the films to tightly stretch over and engage the product 20 and to move toward and into engagement with each other to cause the pressed together upper and lower warmed portions of the film to be heat sealed together.

The cooler outer portions of the films 14 and 24 which were in engagement with the cooler surfaces of the upper and lower platens 30 and 32 are drawn with the warmed film from engagement with the platen and into engagement with the inner sides of the mid-chamber form 10. However, since these cooler portions of the film have not been heat softened to a tacky condition, they do not tend to stick to the walls and ends of the mid-chamber form 10 and so are easily removed from the mid-chamber form at a later stage of operation.

After the package has been formed and heat sealed at the film mating surface, the mid-chamber is opened to the atmosphere. The upper and lower platens are now caused to be moved away from said mid-chamber form 10 and the chamber and packaged product are moved to a trimming operation. As seen in FIG. 1 a pusher plate 110 is now caused to cut or blank the packaged product from the upper and lower films 24 and 14. The packaged product is then transferred to a delivery conveyor 44 for later operations.

ALTERNATE PLATEN CONSTRUCTIONS

Figure 7:
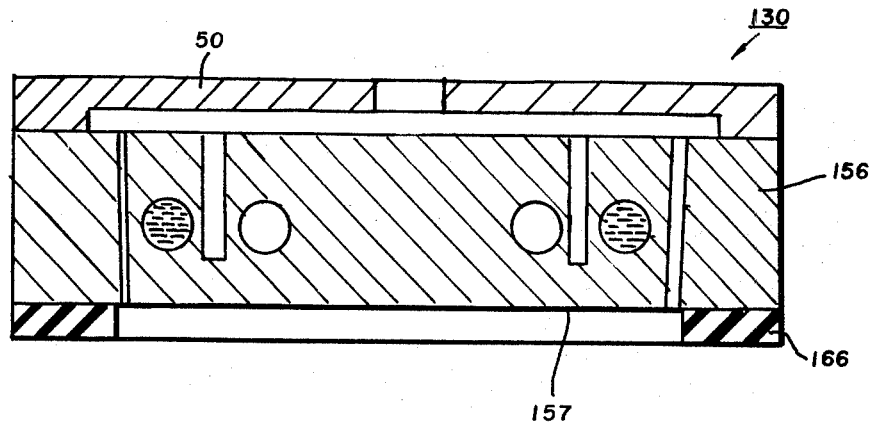
FIG. 7 represents a sectional view, in enlarged scale, of the construction of an alternate platen configuration.

Platen of FIG. 7

Referring next to the alternate platen construction as shown in FIG. 7, it is to be noted that a platen assembly 130 includes an outer plate 50 which is attached to a flat platen 156 having a flat face 157 on its inner surface. A gasket 166 which may be of a thickness of one-eighth of an inch or more provides the necessary gripping surface for sealing a film to the edge of a mid-chamber form 10. Other construction details are substantially identical with the platen construction of FIG. 2 and, of course, it is contemplated that platen assembly 130 may be either an upper or lower platen.

Figure 8:
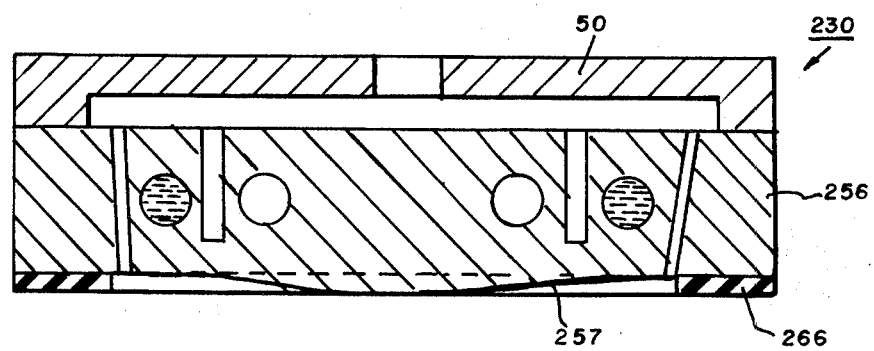
FIG. 8 represents a sectional view, in enlarged scale, of the construction of another alternate platen configuration.

Platen of FIG. 8

Referring next to yet another alternate platen construction as shown in FIG. 8, it is to be noted that a platen assembly 230 includes an outer plate 50 which is attached to a platen 256 having its mid-chamber facing surface formed with an inwardly extending convexedly curved portion 257. A gasket 266 may be about as thick as the inward extent of the curved portion 257 from the plane of the joining of the gasket and platen. Other construction details are substantially identical with the platen construction of FIG. 2 and as in the platen assembly of FIG. 7, it is contemplated that platen assembly 230 may be either an upper or a lower platen.

Figure 9:
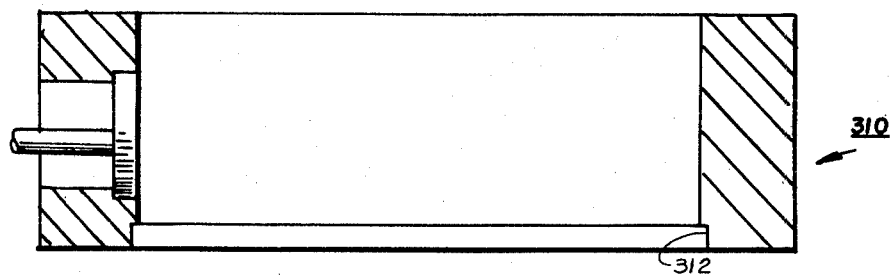
FIG. 9 represents a sectional view, in enlarged scale, of the construction of an alternate mid-chamber configuration with an end surface contoured to receive trays, cut sheets or flat boards.

Mid-Chamber Form of FIG. 9

Referring next to FIG. 9 there is shown an alternate mid-chamber form 310 in which the inner wall is contoured at 312 to receive and retain a tray not shown. The tray to be used with this mid-form is considered to be commercially impervious and has its product supporting surface conditioned or treated for heat sealing to the heated upper film 24. In use these mid-forms, in the arrangement of FIG. 1, would receive trays which are placed in the mid-forms as the mid-forms make their leftward lower movement. The lower film 14 would be eliminated and the knife cutting of the lower film by knife 38 is also eliminated. The upper film 24, as in FIG. 1, is pushed by differential pressure toward and to the tray and into heat sealing contact with the product supporting surface of lower tray. The tray, as used in this embodiment, in addition to being a formed member, may also be a cut board or film.

Figure 10:
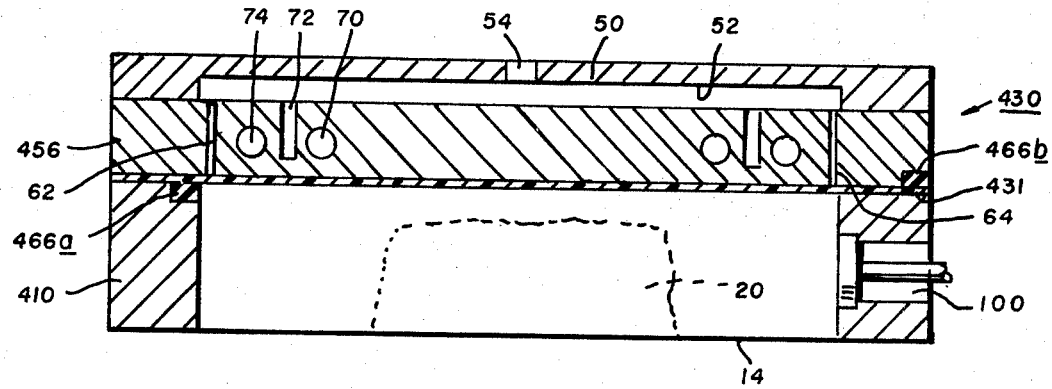
FIG. 10 represents a sectional view, in enlarged scale, of the construction of an alternate platen and the mating end of the mid-chamber.

Platen and Mid-Chamber Form of FIG. 10

Referring next to FIG. 10 there is shown an alternate platen and mid-chamber form for use when the draping film member is a heavy film member. A platen 430 has its film engaging inner surface made as a flat plane against which there may be brought a heavy film 431 having a self-supporting thickness such as 5-to thirty-thousandths of an inch. An outer plate 50, having a recess 52 and passageway 54 therethrough is attached to the backside of platen 456. Vacuum ports 62 and 64, heating means 70, air gap 72 and cooling means 74 are provided and are similar to, if not identical to, those described in conjunction with the apparatus of FIG. 2. A mid-chamber form 410 as shown on its lefthand side has a sealing gasket 466a mounted on its inner edge.

The sealing gasket, instead of being mounted to the mid-chamber form, may be mounted in the platen 456 as is indicated by gasket 466b as shown in the right-hand side of the platen 456. The gasket is adapted to provide a seal of the heavy film 431 to the mid-form 410 so that the mid-chamber may be sealed and a vacuum may be drawn through passageway 100. Product 20 is carried on lower film 14 as in FIGS. 1 and 2.

Figure 11:
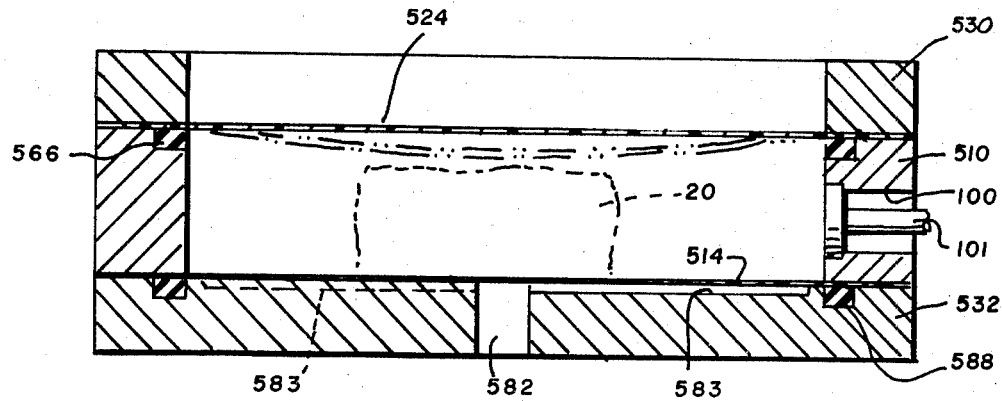
FIG. 11 represents a sectional view, in enlarged scale, of the construction of yet another upper and lower platen construction and the mid-chamber for forming a package from stretchable film.
Figure 12:
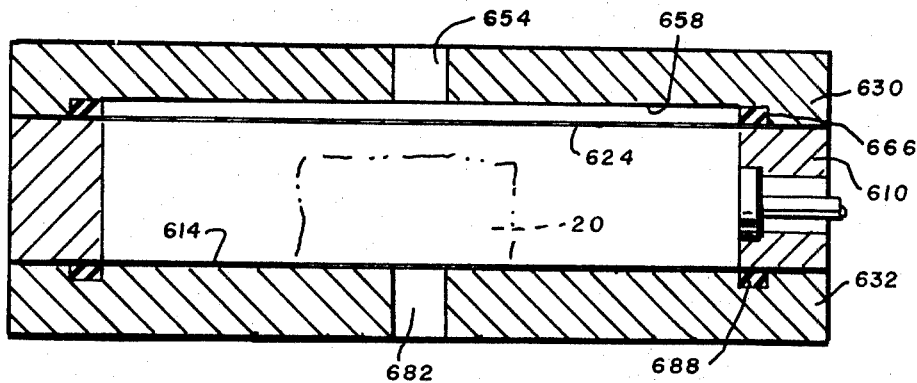
FIG. 12 represents a sectional view of the platens and mid-chamber of the apparatus of FIG. 11 but with a modified configuration of the upper platen whereby air pressure may be applied to the outer surface of the upper film.

Mid-Chamber Assemblies of FIGS. 11 and 12

Referring next to the mid-chamber assemblies of FIGS. 11 and 12 there are shown mid-chamber arrangements wherein no heat is used to make the film stretchable. Films such as "Surlyn" (TM of E.I. duPont) having properties which permit stretching without rupture may have one or both of their facing surfaces coated with an adhesive such as a self-stick adhesive. This adhesive may be locally applied or be applied in an allover treatment or pattern.

Assembly of FIG. 11

In FIG. 11 there is seen an assembly in which a mid-chamber form 510 has a passageway 100 therethrough and a valve 101 adapted to open and close this passageway. A gasket 566 provides a releasable sealing means for forming a chamber when a stretchable upper film 524 is clamped to the upper face of the mid-chamber form 510 by means of a clamp form or ring 530. As seen, this ring is open in its center so as to place the center portion of the outer surface of the upper film in communication with the atmosphere. A bottom platen 532 is provided with a gasket 588 by which a bottom film or member 514 is sealed to the mid-chamber form 510. A passageway 582 communicates through the bottom platen to a pattern of fluted grooves 583 formed in the supporting surface of the bottom platen.

Assembly of FIG. 12

In FIG. 12 is shown an alternate embodiment to the assembly of FIG. 11. In this alternate embodiment, an upper platen 630 has a recess 658 formed in the inner face of the platen. This recess communicates with a passageway 654 to permit atmosphere or pressurized gas or air to be brought to the outer surface of a stretchable upper film 624. A gasket 666 insures that the upper film 624 is releasably sealed to the upper face of a mid-chamber form 610 having a passageway 100 and poppet valve 101 provided in its sidewall. A lower film 614 rests upon the upper surface of a bottom platen 632 which, in addition to the film 614, supports a product 20 as shown in phantom outline. A gasket 688 mounted in a groove in platen 632 insures that the lower film 614 is releasably sealed to the mid-chamber form when the upper and lower platens are pressed to the mid-chamber form. A passageway 682 through platen 632 communicates to the underside of film 614. If desired, fluted grooves similar to those in the bottom platen 532 of FIG. 11 may be provided.

DRIVE SYSTEM FOR AUTOMATIC PACKAGING

Figure 13:
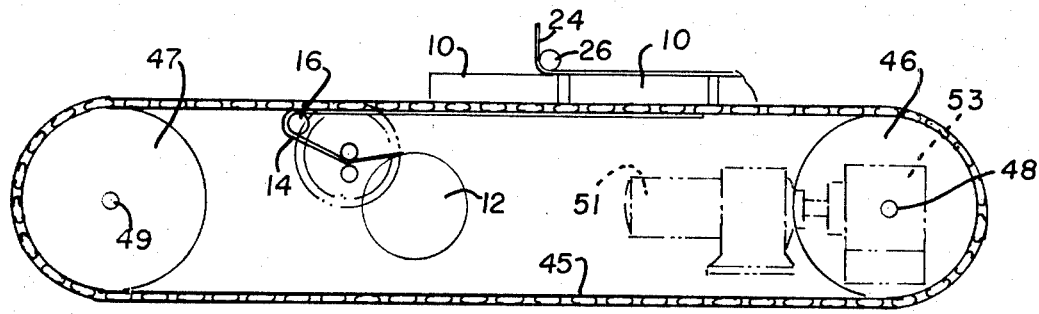
FIG. 13 represents a somewhat diagrammatic arrangement of a drive system for a continuously operated vacuum skin packaging apparatus.

Referring next to FIG. 13 there is shown a representative or diagrammatic showing of a drive system which may be used in combination with the showing of FIG. 1. The mid-chamber forms 10 are contemplated as being attached to like endless strands of roller chain 45, carried on pairs of head and tail sprockets and pulleys 46 and 47, rotatably supported on shafts 48 and 49. A gear motor 51 is connected to shaft 48 through a gear box 53. The motor 51 is contemplated as being continuously operated during the sequence of forming the package. If intermittent advancement of the pair of roller chains 45 is desired a clutch system or mechanical interrupted advancing actuation as by a Geneva mechanism may be provided. The desired movement of the chains determines the movement method which is merely a matter of selection by the designer.

SUPPORT OF THE LOWER FILM

System of FIG. 14

In the diagrammatic representation of FIG. 1 and in the mechanical drive arrangement of FIG. 13, abovedescribed, the lower film 14 is shown as being fed from a lower roll 12 to the underside of mid-chamber form 10. Support for this film as it is fed to the platen station for packaging is necessary where the product 20 is placed on the film prior to the arrival of the film and mid-chamber form at the package-forming station. In the embodiment of FIG. 14 an endless belt 60 is carried on its upper extent by a slide plate 61. The belt is mounted on pulleys 65 and 67, one of which is connected by a drive transfer means to a shaft 48 or 49, as seen in FIG. 13.

As seen in this representation, upper platen 30 is cycled by an air cylinder 75 carried on a support member 76. A smaller air cylinder 77 is also carried on this support member and has a knife 78 adapted to cut the top film 24 after the package has been made. A lower cylinder 79 is also carried on the lower portion of support member 76 and is connected to lower platen 32 and cycles this platen. Knife 38 is disposed to cut the lower film 14 after the package has been formed. This knife is carried by cylinder 81 also attached to the lower part of the support member 76. It is also to be noted that the pusher plate 110 is carried by a cylinder mounted on a support 85. After pushing the packaged product 42 from mid-chamber 10 it falls on carrier 44 which may be a roller conveyor carried by frame 91.

System of FIG. 15

Referring next to FIG. 15 there is seen an alternate arrangement for the support of the lower film 14. Instead of a slide plate as in FIG. 14 there is provided a roller conveyor having a series of freely turning rollers 103. Lower film 14 is brought over pulley 16 to the roller 103 after which the product 20 is placed on the film and midway of the sidewalls of the mid-chamber form 10. Upper film 24, guide roll 26, upper platen 30 and lower platen 32 operate as described above.

Figure 16:
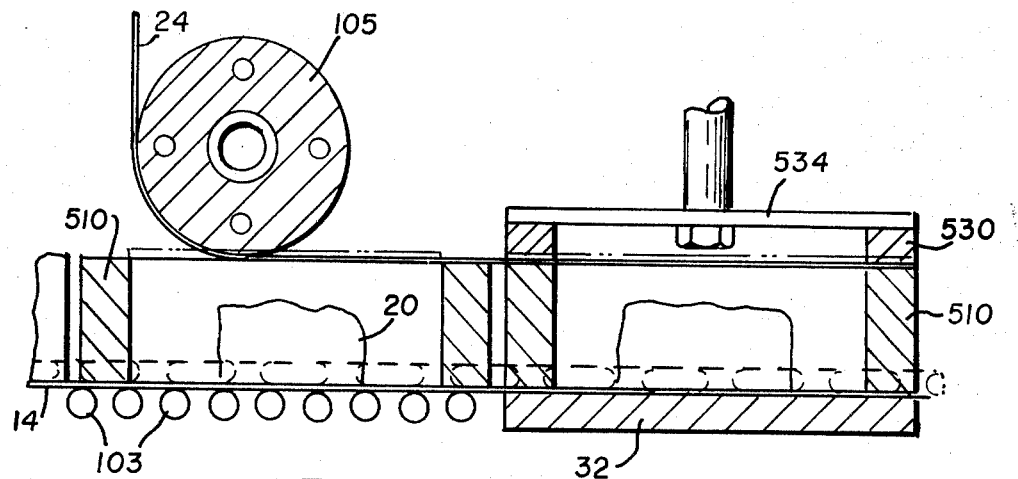
FIG. 16 represents, in an enlarged scale, a sectional view showing one means of heating an upper film prior to its arrival at a package forming station.

Chamber of FIG. 16

Referring next to FIG. 16 it is to be noted that the chamber of FIG. 11 instead of using a stretchable film 524 may instead use a thermoplastic upper film 24. A heated roller 105 is disposed to receive the film strip 24 and guide the heated film to the top of a mid-chamber form 510 to the packaging station where clamp form 530 carried by a plate 534 moved by a cylinder, not shown, completes the station. The lower film 14 is shown as transported by rollers 103 until the lower platen 32 is reached, whereupon the lower film may be warmed. When the mid-chamber portion is suddenly exposed to a source of vacuum through a large passageway the films 24 and 14 are drawn toward each other.

Figure 17:
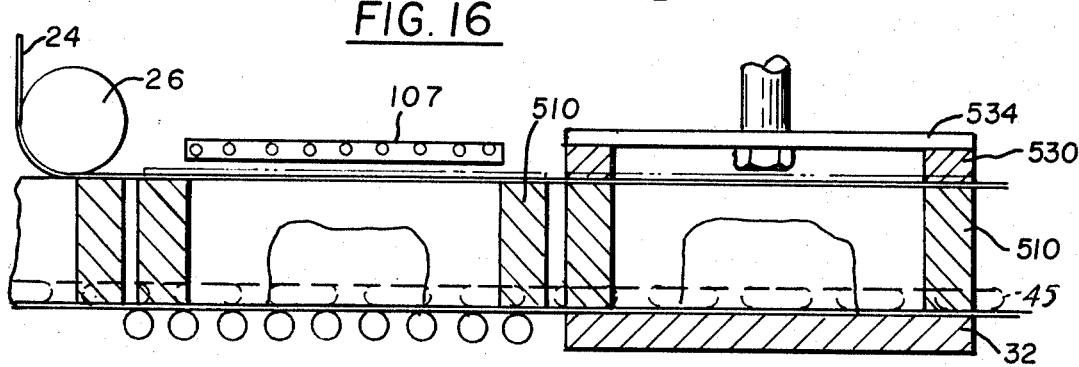
FIG. 17 represents in a like enlarged scale a sectional view showing an alternate means of exteriorly heating an upper film prior to its arrival at a package forming station.

Chamber of FIG. 17

Referring next to FIG. 17 wherein an alternate means of heating of the upper film is shown, it is to be noted that the film 24 is brought around pulley 26 and then as the mid-chamber form 510 is advanced the upper film is brought under a heater 107 where the film is heated to the desired condition. At the packaging operation the lower film may be heated by the platen 32 if desired. The operation is similar if not identical to the operation as in FIG. 16 described above.

Figure 18:
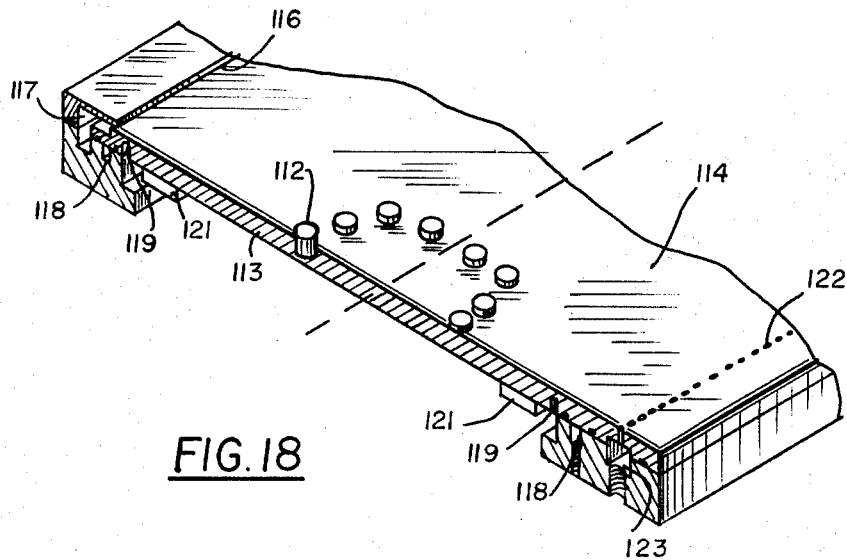
FIG. 18 represents a lower platen having product elevation plugs and showing two means of evacuating the residual air from between the lower film and the platen.

Bottom Platen Construction of FIG. 18

Referring next to FIG. 18 there is shown a detailed arrangement of two forms of construction of a bottom platen for use with apparatus for packaging fresh meat and the like wherein the product to be packaged should not be exposed to a heat contact such as is necessary to soften thermoplastic film for heat sealing to the upper film. In the bottom platen of FIG. 18 there is provided a plurality of insulating buttons 112 which have a low heat conductivity. These buttons may be made of silicone rubber and the like, so that when mounted in a plate 113 they extend a short distance above the upper surface mid-portion of the plate. A top surface 114 of "Teflon" (TM E.I. duPont) may be provided on plate 113 to assist in the release of the bottom film from the platen.

In the platen seen, the left portion is formed with a narrow slot 116 which is in communication with a passageway 117 which is in flow communication with a valve system to open and close passageway 117 to a source of vacuum or atmosphere. A water conduit 118 is also provided in the under portion of the platen. This conduit is inwardly disposed from the passageway 117 and with cool water maintains the outer edge portion of the platen at a reduced temperature. An air slot 119 is formed in plate 113 and is provided to reduce heat transfer from the mid-portion of the platen to the outer edges. A heating element 121 is attached to the underside of the plate 113 to provide the desired amount of heat to the plate.

The right side of this platen shows a vacuum passageway arrangement wherein instead of slot 116 a series of small holes 122 are in flow communication with a vacuum passageway 123 which is in conductive communication with a valve disposed to open and close passageway 123 to a source of vacuum or to the atmosphere. Water conduit 118, air slot 119 and heating element 121 are like the construction on the left side of the platen.

Vacuum Valving Arrangement of FIGS. 19 and 20

Referring next to FIGS. 19 and 20 there is shown a valving arrangement for automatically connecting a source of vacuum to the mid-chamber. The bottom platen shown in FIG. 19 is represented with a slot communication to the vacuum passageway 117 in the manner of the left side portion of FIG. 18. Mid-chamber 10 has a large passageway 132 formed in its sidewall. The outer surface 133 of mid-chamber is made reasonably flat and smooth so that a gasket 134 provided on the outer flanged end of a sleeve valve 135 will provide a seal with the mid-chamber. A spring 136 urges sleeve valve 135 outwardly. A stop plate 137 is attached to the inner end of sleeve valve 135 and has a gasket face 138 disposed to engage and seal against a protruding ring 139 carried by box member 140. Scalloped cutouts 141 are formed in the sleeve 135 near the stop plate 137. The interior 142 of box member 140 is in flow communication with vacuum conduit 143.

As seen in FIG. 20 an air cylinder 145 has its piston rod 146 attached to box member 140 so as to move the box and sleeve valve 135 with it as the cylinder is actuated. When box 140 is moved towards the mid-chamber form 10 the gasket 134 engages the surface 133 and is compressed by the strength of spring 136 as the box 140 is moved forwardly by the cylinder 145. The forward movement of box 140 causes sleeve valve 135 to move into the interior 140 and to move gasket 138 from sealing ring 139 and uncover scalloped cutouts so that vacuum conduit is in flow communication with the interior of the mid-chamber form 10.

After the package has been made and the mid-chamber form is to be opened to the atmosphere, the cylinder 145 is actuated to move box member 140 from the mid-chamber 10. Spring 136 causes sleeve valve 135 to move outwardly or leftwardly until gasket 138 is in sealing engagement with ring 139. Further movement of cylinder 140 to the position and condition of FIGS. 19 and 20 uncovers passageway 132 to the atmosphere.

Figure 21:
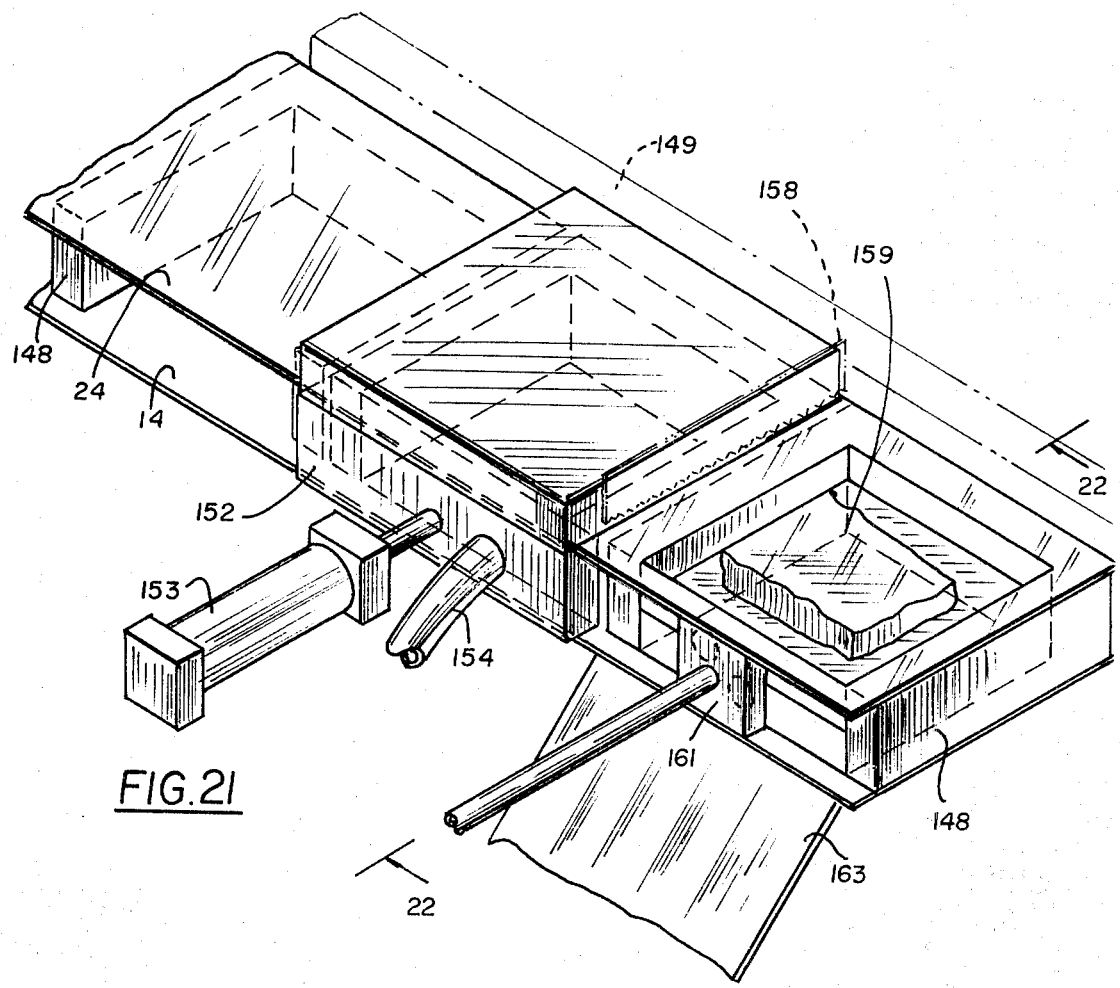
FIG. 21 represents an isometric view of an alternate construction of the mid-chamber wherein one wall is removable so as to permit side removal of the packaged product.
Figure 22:
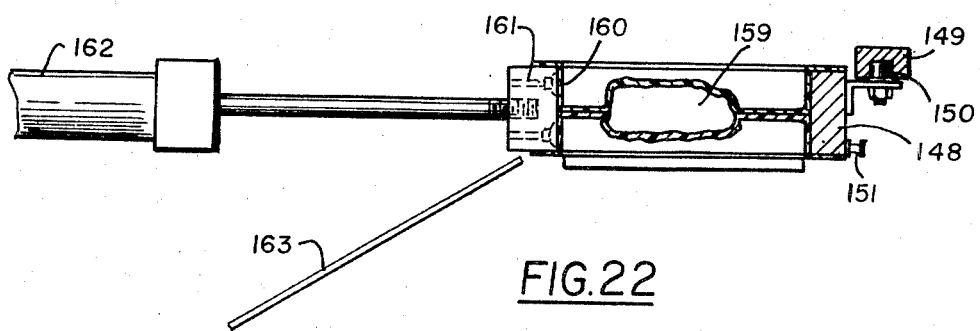
FIG. 22 represents a sectional view of the mid-chamber of FIG. 21 the view taken on the line 22—22 and looking in the direction of the arrows.

Chamber of FIGS. 21 and 22

Referring next to FIGS. 21 and 22 there is depicted a mid-chamber construction wherein it is desirable to be able to discharge the packaged product from the side of the chamber rather than through the bottom of the mid-chamber form. Accordingly a U-shaped mid-chamber portion 148 is movable along a trackway including a roller guide 149 in which roller 150 moves. Roller 150 is attached to portion 148 to act as a guide means. Roller chain 151 is moved to advance the attached portion 148. A front portion 152 carried by and cycled by a cylinder 153 is adapted to seal to and form the remaining wall of a mid-chamber form. A flexible vacuum conduit 154 is attached to the front portion 152 and communicates with the interior of the chamber.

The mid-chamber portion 148, as seen, is moved from left to right and when it comes in way of front portion 152 opposed top and bottom platens, such as abovedescribed, are moved to trap upper and lower films 24 and 14 as also abovedescribed. The product is placed on the lower film before the chamber is closed and after the package has been formed a knife 158 may be cycled to cut the films between adjacent portions 148. The packages product is enclosed by extending film portions and the forward portion 160 may be engaged by a suction head 161 carried by the rod of a cylinder 162 and, with suction applied, the package is drawn sideways from the mid-chamber portion 148 and may be discharged onto a chute 163.

This arrangement is contemplated to be used particularly in conjunction with packages using heavier films which during their package forming develop outwardly extending members tending to cling to the upper and lower faces of the mid-chamber form 148. To remove the package from the mid-chamber form, the easiest motion is provided by sliding the package parallel to the upper and lower surfaces. The suction head 161 is one means of releasably gripping the front portion 160; however, this head may be provided with gripping fingers adapted to positively grasp the forward package portion while the package is slid from the open U-shaped mid-chamber to remove the packaged product. This permits exterior trimming of the packaged product and also perhaps better salvage of the scrap film.

Film Transport System of FIGS. 23-26

Figure 23:
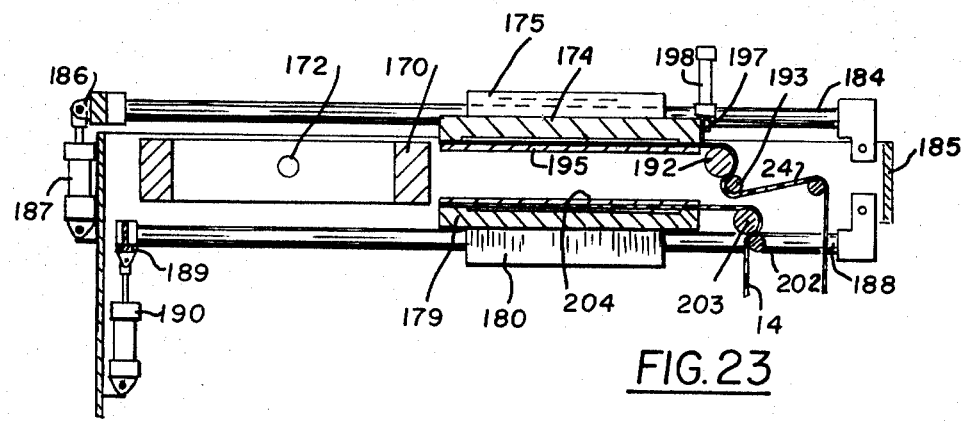
FIG. 23 represents a partly diagrammatic sectional view of a film transport system wherein the upper and lower films are gripped by the upper and lower platens which are movable to and away from a fixed mid-chamber form.
Figure 26:
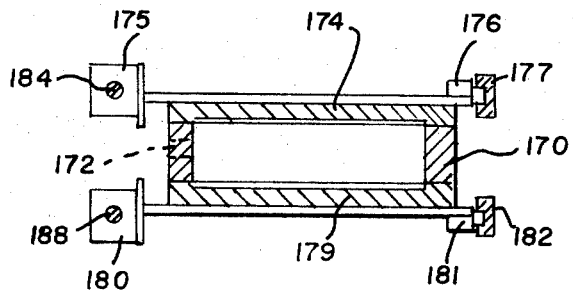
FIG. 26 represents a sectional view of the chamber of this film transport system with the view taken on the line 26—26 of FIG. 25 and looking in the direction of the arrows.

Referring finally to FIGS. 23 through 26 there is shown a film transport system where the mid-chamber is maintained in a fixed position and the film and upper and lower platens are moved into packaging condition. For example, where large cuts or fresh meat, often called a sub-primal, are to be packaged it is more practical to package at a fixed station rather than trying to move a product which may weigh thirty or more pounds on a film and conveyor as in FIG. 13. As seen in FIGS. 23 and 26, a mid-chamber 170 having a vacuum port 172 is maintained in a fixed position. Upper platen 174 is carried on one side by a cylinder 175 and on the other side by a slide 176 movable in a guide 177. In like manner lower platen 179 is carried on one side by a cylinder 180 and on the other side by a slide 181 movable in guide 182.

Cylinder 175 is movable on a piston rod 184 having its right end pivotally supported on bracket 185. The other end of rod 184 is carried in a clevis end 186 carried by the rod of a cylinder 187. Cylinder 180 is movable on a piston rod 188 having its right end also pivotally supported on bracket 185. The other end of this rod is carried in a clevis end 189 carried by the rod of a cylinder 190. The upper film 14 is fed to a pair of feed rolls 192 and 193 and on to a support plate 195. A knife 197 is actuated by a cylinder 198 carried on the upper platen 174. A like knife 199 is carried by a cylinder 200 carried by the lower platen 179.

Lower film 14 is fed by feed rolls 202 and 203 to the underside of a support plate 204 which acts as a backup to the film. Both plate 204 and support plate 195 have parts or passageways through them and these are connected to a source of vacuum so as to draw the films to the respective plates. This gripping vacuum is only sufficient to releasably retain the film to the plates. The use and operation of this film transport will be hereinafter more fully described.

OPERATION AND USE OF THE VACUUM SKIN

Package Apparatus

In the abovedescribed apparatus the packages to be formed have been formed by a differential pressure. The preferred means of providing this differential of pressure is by bringing the product and the area between the upper and lower films to a condition of reduced pressure by connection to a source of vacuum. Through warming or through other conditioning means at least one of the films is brought to a draping or stretching condition so that it may be drawn into sealing engagement with the other film while at the same time it or they are drawn tightly around the product being packaged. With the exception of the apparatus of FIGS. 23 through 26 it is contemplated that the apparatus may be a continuous operation with the mid-chamber forms being carried by roller chains in the manner of the drive system of FIG. 13. With the exception of FIGS. 21 and 22 it is contemplated that the mid-chamber forms such as 10, seen in FIG. 1, are of single unit construction. Where the packaged product and trimmed film are very difficult to remove the U-shaped mid-chamber portion 148 and front portion 152 of FIGS. 21 and 22 provide a complete mid-chamber form.

The platen construction includes those of FIGS. 2, 7, 8 and 18. In particular where meat and like products are to be packaged with apparatus wherein the bottom film is to be heated the insulating buttons 112 of FIG. 18 provide means for lifting the product from unwanted heat contact. Although at the point of button contact the film is not heated to the same extent as the film drawn to the heated surface 114, when the package is drawn tightly around the product these localized areas of film are also drawn tightly to the product as the weight of the product on the localized areas usually conform the film at those areas to the product.

In the feeding of film to the automatic mechanism the lower film may be carried on a slide or a roller conveyor. In any case some suitable support for both lower film and product must be provided. The upper film is usually brought in way of the upper surface of the mid-chamber form and then advanced with the form. Where the clamp ring 530 is used as in FIGS. 16 and 17 the upper film may be heated just prior to the film and mid-chamber form 510 arriving at the forming station and clamp form 530. Where this arrangement is to be used it is contemplated that the upper film 24 will be sufficiently heated by either heated roller 105 or radiant heater 107. After clamping, the mid-chamber form and product therein is rapidly evacuated by opening a large conduit to a source of vacuum. Guards or other restricting means may be necessary to cover the vacuum opening in mid-chamber form 510 to prevent the unwanted movement of film to and into this opening.

In the construction of the platen of FIG. 18 the narrow slot 116 or holes 122 are made quite small such as a few thousandths of an inch in width. This small dimension prevents thin films from being stretched so as to be easily perforated. The water cooling of the outer portions of the platen insures that the film does not become overly softened so as to be easily ruptures when vacuum is opened to conduits or passageways 117 and 123.

The vacuum to the mid-chamber may be provided as in FIGS. 19 and 20 or as in FIGS. 4 and 5 with a poppet valve. A connected line as represented by conduit 154 in FIG. 21 may also provide a vacuum connection to the closed mid-chamber.

In the film transport system of FIGS. 23 through 26 it is contemplated that the lower film will initially be brought in way of support plate 204 and by means of vacuum through the plate the film is retained in position on the plate 204. In FIG. 23 the cylinder 180 has been actuated to carry the lower platen 179 to the right of mid-chamber form 170 and adjacent plate 204. Vacuum to the several ports in the face of the platen is caused to be developed so that the suction developed on the face of the platen is much greater than that on plate 204. This causes the film to be moved from the plate to the platen so that when the platen 179 is moved leftwardly the film 14 is carried with it. Cylinder 190 is actuated to lower both rod 188 and guide 182 so that the platen and suction-retained lower film can be easily moved into position below mid-chamber form 170. When in position the cylinder 190 is actuated to move the lower platen and film into the closed condition of FIG. 24.

Figure 24:
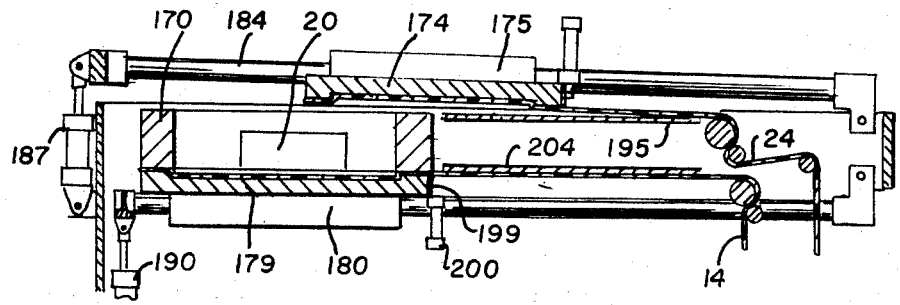
FIG. 24 represents the sectional view of the film transport system of FIG. 23 with the system in an intermediate stage of operation.
Figure 25:
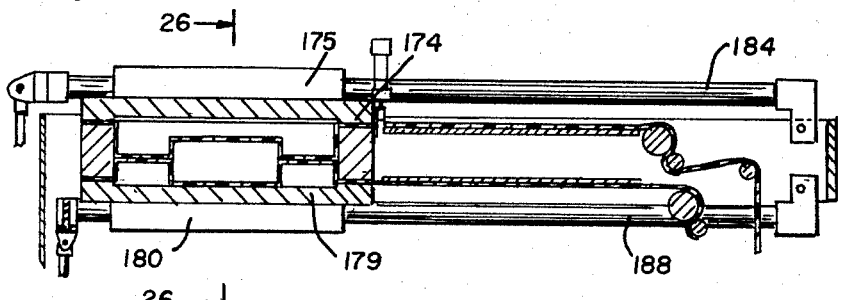
FIG. 25 represents the sectional view of the film transport system of FIG. 23 with the system in package forming condition.

After product 20 has been placed on the lower film and platen the upper platen 174 is caused to be moved leftwardly by cylinder 175. The upper film 24 is retained on support plate 195 by low vacuum as is the lower film on plate 204. When upper platen 174 is to be moved leftwardly from the position of FIG. 23 a greater suction force is developed on the surface of platen 174 so that the film is moved to and is gripped on the face of the platen. As seen in FIG. 24 cylinder 187 is actuated to cause rod 184 and guide 177 to be lifted so that platen 174 and upper film 24 may be easily moved to a position immediately above mid-chamber form 170. In FIG. 24 the upper platen 174 is shown substantially midway of rod 184.

After both upper and lower platens 174 and 179 are in position the cylinder 187 and 190 are actuated to move the platens and film to the mid-chamber form to seal the mid-chamber and film. The films are heated by the platens and the mid-chamber area between the films is brought to a condition of reduced pressure. After sufficient heating vacuum to the platens is shut off and opened to atmosphere so that the outer surfaces of the films against the platens are moved by atmospheric pressure whereat they rapidly move to the sealing condition abovedescribed. Knives 197 and 199 are actuated to cut the films 24 and 14 after which the mid-chamber is opened to the atmosphere. Cylinders 187 and 190 move the platens from the mid-chamber and cylinders 175 and 180 move the upper and lower platens rightwardly to the condition of FIG. 23 after which the cycle is repeated.

DESCRIPTION OF THE METHOD OF PACKAGING

Using a Thermoplastic Film

The method of packaging as provided by the use of the abovedescribed apparatus includes the steps of placing a product 20 upon a lower member which may be a thermoplastic film or a tray 14; surrounding the product by an advancing outer mid-chamber form 10; bringing an upper thermoplastic film 24 close to the upper surface of the advancing mid-chamber form 10; moving both the upper and lower platens into engagement with the ends of the mid-chamber form 10 to cause a sealed chamber to be formed and with the upper and lower films 24 and 14 gripped at their edges to provide a determined chamber area between the upper and lower film or tray; moving either or both the upper and lower films by means of a pressure differential to and against the upper and lower platens which may be locally heated and cooled and maintaining the film against the surface platens for a period of time sufficient so that determined portions of the upper and lower film are heated to a softened and heat sealing condition; causing the mid-portion of the chamber between the held films and/or tray to be brought to a condition of reduced pressure; shutting off the source for producing a pressure differential to the upper and lower platens which is used to move the films against the upper and lower platens; exposing the outer portions of the upper film and when used for the packaging of the product, a lower film in the chamber to atmospheric pressure or even a light amount of additional air pressure to cause the softened portions of the film or films to be urged toward and around the product and into engagement with each other to cause a hermetically sealed package to be formed; moving the upper and lower platens away from the now packaged product; trimming or severing the packaged product from the webs of the thermoplastic films, and accumulating the scrap portion of the webs of film as by winding on a roll.

ALTERNATE METHOD OF FORMING A PACKAGE

Using a Thermoplastic Film

It is to be noted that instead of using vacuum to draw the upper and lower films 24 and 14 to the upper and lower platens 30 and 32, the pressure differential may be provided by introducing pressurized air or gas into the mid-chamber through passageway 100. This pressurized gas is caused to remain as long as it is necessary to maintain the films in engagement with platens for heating of the films. After the heating cycle is completed, the pressure source for the mid-chamber is cut off and the passageway 100 opened to a source of lower pressure. Passageways 54 and 82 are opened to a pressure means such as air pressure to cause the heated film to be pushed to and around the product and into a heat sealing condition. This may also be accomplished by opening passageways 54 and 82 to the atmosphere and connecting passageway 100 to a source of vacuum or reduced pressure.

Use of a Tray or Cut Film

In certain applications it may be desirable for the upper film to have a thickness of several thousandths of an inch as shown in FIG. 10. This is particularly true when the product to be packages is a hardware or automotive repair part of substantial weight. The bottom member may be a tray member having a plastic coated surface providing with a substrate an impervious member which may be heat sealed to the heavier upper film. The heated heavy film, as it is pushed against the product, forms itself to the product but usually does not enter any of the narrow recesses to a great extent. In particular a tray or board having a thermoplastic surface adapted for the heat sealing thereto by a heated film may have a mid-form 310 as in FIG. 9 and into the contoured recess 312 the tray is mounted and is transported.

Gas Flushing the Product

When the product to be packaged is a product such as cheese that requires treating as by a flush of nitrogen gas, the gas is introduced through passageway 100. The gas under pressure may be used to press the film against the heated platen for a determined period of time or may be supplied simply as a conditioning agent.

Stretching the Film for Heating

The curved platen of FIG. 7 is used where the nature of the film is to tend to wrinkle. The curved surface 257 causes the film to be stretched during heating so as to smooth and remove any wrinkles from the film.

Description of the Method of Packaging Using a Stretchable Film

In the use of a stretchable film as with the apparatus of FIGS. 11 or 12, the method of packaging includes the steps of placing a product 20 upon a lower member which may be a cut film or a tray; surrounding the product by an advancing outer mid-chamber form 510 or 610; bringing an upper stretchable film 524 or 624 close to the upper surface of the advancing mid-chamber form; moving upper and lower platens into engagement with the ends of the mid-chamber form to cause a hermetically sealed chamber to be formed and with the upper and lower films gripped at their edges to provide a determined chamber area between the upper and lower film or tray; causing the midportion of the chamber between the held films and/or tray to be brought to a condition of reduced pressure; exposing the outer portions of the upper film to the atmosphere and when used for the packaging of the product, a lower film in the chamber to atmospheric pressure or even a light amount of additional air pressure to cause the exposed portions of the film or films to be urged toward and around the product and into engagement with each other and with adhesively treated surfaces thereon to cause a hermetically sealed package to be formed; moving the upper and lower platens away from the now packaged product; trimming or severing the package product from the webs of the thermoplastic films, and accumulating the scrap portion of the webs of film as by winding on a roll.

In this method the stretchable film is held by platen frame 530 or upper platen 630 so that when vacuum is applied to a large conductor 100 the upper film is rapidly drawn into the mid-form and toward the product 20. In FIG. 12 the passageway 654 provides means to apply additional pressure to the upper film 624 and to move it around the product 20 and to the lower film 614 to which it is adhered by means of a self-stick adhesive or other suitable adhesive.

Definitions

In the above description certain terms have been used to describe certain conditions. These terms, for the purpose of this specification, are applied in a commercial sense rather than with a strictly technical meaning.

"Hermetically sealed" is meant as a package which is hermetically sealed except to the extent that the film members may be susceptable to permeation of certain gases such as oxygen.

"Impervious" as applied to the tray or film also means that these members are subject to slow permeation of certain gases such as oxygen, rather than gaseous flow as through a filter.

"Vacuum" as applied to the process means a vacuum pump or chamber adapted to reduce the pressure to an extent substantially less than one atmosphere.

"Film" as applied to the upper and/or lower members is applied to a thermoplastic sheet or strip which may have a thickness of one- or two-thousandths of an inch or may be as thick as twenty- or thirty-thousandths of an inch.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the package forming apparatus may be constructed or used.

The above description and drawings of the package forming apparatus and method and its many applications are not limited to the specific embodiments shown but departures therefrom may be made without sacrificing their advantages and protection is sought to the broadest extent the prior art allows.

I claim:

1. The method of forming a package in which there is provided an upper and lower packaging member, one of which is thermoplastic film adapted for heating to a condition for forming to a product, and in which the facing surfaces of the packaging members are adapted for sealing to each other by pressure, the method including the steps of (a) moving a lower packaging member in way of the lower facing surface of a mid-chamber form having a selectively closable large volume passageway through the wall thereof; (b) supporting the lower packaging member with a lower platen; (c) placing a product on the lower packaging member; (d) moving the lower platen toward the mid-chamber form to clamp the edges of the lower packaging member between the platen and mid-chamber form; (e) bringing an upper packaging member to the upper face of the mid-chamber form; (f) moving an upper platen toward the mid-chamber form to clamp the upper packaging member by its edges to the upper face of the mid-chamber form; (g) moving the upper platen and lower platen toward each other to seal the films to the mid-chamber; (h) heating inner portions of the thermoplastic film by drawing the film into contact with a localized heated mid-portion area of a platen; (i) opening the passageway through the sidewall of the mid-chamber form to a large source of vacuum to rapidly bring the mid-chamber to a condition of reduced pressure; (j) applying pressure to substantially all of the exterior surface of the heated thermoplastic film to cause this heated portion within the mid-chamber form to be urged toward and around the product and into sealing engagement with the other packaging member and to cause a hermetically sealed package to be formed around the product; (k) shutting off the vacuum to the mid-chamber and opening the mid-chamber to atmospheric pressure, and (l) moving the upper platen from the upper surface of the mid-chamber form and moving the lower platen from the mid-chamber form to permit removal of the packaged product from the mid-chamber form.

2. The method of forming a package as in claim 1 in which the upper packaging member is a thermoplastic film and the lower packaging member has at least an upper supporting surface of thermoplastic film, the method including the further step of opening the small communication passageways of the upper and lower platens to the source of vacuum to urge the upper and lower packaging members to the platens to warm substantially only the center portion of the members and after a determined period of warming, shutting off the vacuum to the small communication passageways and opening the passageways to atmospheric pressure to cause the upper and lower packaging members to be moved toward each other and around the product.

3. The method of forming a package in which there is provided an upper and lower packaging member, one of which is a thermoplastic film adapted for heating to a condition for forming to a product, and in which the facing surfaces of the packaging members are adapted for sealing to each other by pressure, the method including the steps of: (a) moving a lower packaging member in way of the lower facing surface of a mid-chamber form having a selectively closable large volume passageway through the wall thereof; (b) supporting the lower packaging member with a lower platen; (c) placing a product on the lower packaging member; (d) moving the lower platen toward the mid-chamber form to clamp the edges of the lower packaging member between the platen and mid-chamber form; (e) bringing an upper packaging member to the upper face of the mid-chamber form; (f) moving an upper platen toward the mid-chamber form to clamp the upper packaging member by its edges to the upper face of the mid-chamber form; (g) moving the upper platen and lower platen toward each other to seal the films to the mid-chamber; (h) heating the thermoplastic film by drawing the film into contact with a localized heated area of a platen; (i) opening the passageway through the sidewall of the mid-chamber form to a large source of vacuum to rapidly bring the mid-chamber to a condition of reduced pressure; (j) applying pressure to substantially all of the exterior surface of the heated thermoplastic film to cause this heated portion within the mid-chamber form to be urged towards and around the product and into sealing engagement with the other packaging member and to cause a hermetically sealed package to be formed around the product; (k) shutting off the vacuum to the mid-chamber and opening the mid-chamber to atmospheric pressure, and (l) moving the upper platen from the upper surface of the mid-chamber form and moving the lower platen from the mid-chamber form to permit removal of the packaged product from the mid-chamber form and in which method the upper packaging member is a thermoplastic film, and the upper and lower platens each have locally heated center portions and around these center portions of the platens are small communication passageways leading from the outer surfaces of the adjacent packaging members to a vacuum source connected to the platen and communication passageway and a valve means adapted to shut off the vacuum source to the passageways, the atmosphere and the like, the method including the further step of opening the small communication passageways of the upper and lower platens to the source of vacuum to urge the upper and lower packaging members to the platens to warm the center portion of the members and after a determined period of warming, shutting off the vacuum to the small communication passageways and opening the passageways to atmospheric pressure to cause the upper and lower packaging members to be moved toward each other and around the product and wherein the lower packaging member is thermoplastic film and at least the lower platen is provided with a plurality of insulating members extending above the heated surface of the lower platen, the method including the further step of arranging the product on the lower packaging film so that the product rests on film resting on insulating members whose upper surface is a determined distance above the heated surface as and when the lower film is drawn toward the platen surface.

4. Apparatus for forming a package around a product in which there is provided an upper and a lower packaging member one of which is a thermoplastic film disposed to be heated to a stretchable condition adapted for forming to a product, and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be moved into sealing condition with the lower surface of the mid-chamber form; (c) an upper platen adapted to mate with the upper sealing surface of the mid-chamber form; (d) upper and lower packaging members adapted to be moved into sealing condition, the lower member supporting the product and with one of the members being the thermoplastic film; (e) means for heating substantially only the mid-portion of one of the platens and drawing the thermoplastic film thereagainst to warm the film to a stretchable condition adapted for forming to a product, and with the facing surfaces of the packaging members conditioned for sealing together by pressure; (f) means for positioning the upper and lower packaging members adjacent the respective upper and lower ends of the mid-chamber form; (g) means for moving the lower and upper platens toward and to the mid-chamber form so as to clamp the upper and lower packaging members at their edges to the mid-chamber form to provide a sealed chamber; (h) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed, and (i) means for shutting off the vacuum to the mid-chamber, opening the mid-chamber to the atmosphere and removing the upper and lower platens from the mid-chamber to permit removal of the packaged product therefrom.

5. Apparatus for forming a package around a product in which there is provided an upper and a lower packaging member one of which is a thermoplastic film disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be moved into sealing condition with the lower surface of the mid-chamber form; (c) an upper platen adapted to mate with the upper sealing surface of the mid-chamber form; (d) said upper and lower platens have locally heated center portions, small communication passageways leading from their surfaces to a vacuum source, and valve means adapted to shut off the vacuum source to the passageways and to feed to these passageways a supply of pressurized air; (e) upper and lower packaging members adapted to be moved into sealing condition with the lower member supporting the product and with one of the members being the thermoplastic film; (f) means for heating the mid-portion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed; and (j) means for shutting off the vacuum to the mid-chamber, opening the mid-chamber to the atmosphere and removing the upper and lower platens from the mid-chamber to permit removal of the packaged product therefrom.

6. Apparatus for forming a package as in claim 4 in which the passageway through the sidewall of the mid-chamber form is also connected to a means for providing a gas flushing supply, a pressurized air supply and the like and there is provided a valve means for selectively bringing said sealed chamber into communication with at least two of these product and chamber treating supply means.

7. Apparatus for forming a package around a product in which there is provided an upper and a lower packaging member one of which is a thermoplastic film disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be moved into sealing condition with the lower surface of the mid-chamber form; (c) an upper platen adapted to mate with the upper sealing surface of the mid-chamber form; (d) said upper heated platen having its film engaging surface formed with a slight recess in its midportion providing a rim portion around its outside and provided with a resilient gasket adapted to engage the film and to be pressed thereagainst by the clamping of the heated platen to the mid-chamber form; (e) upper and lower packaging members adapted to be moved into sealing condition with the lower member supporting the product and with one of the members being the thermoplastic film; (f) means for heating the midportion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed, and (j) means for shutting off the vacuum to the mid-chamber, opening the mid-chamber to the atmosphere and removing the upper and lower platens from the mid-chamber to permit removal of the packaged product therefrom.

8. Apparatus for forming a package around a product in which there is provided an upper and a lower packaging member one of which is a thermoplastic film disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be moved into sealing condition with the lower surface of the mid-chamber form; (c) an upper platen adapted to mate with the upper sealing surface of the mid-chamber form; (d) said upper heated platen having its film engaging central surface formed with a slight convex curve adapted to stretch the film and to eliminate wrinkles as the film is drawn against the platen; (e) upper and lower packaging members adapted to be moved into sealing condition with the lower member supporting the product and with one of the members being the thermoplastic film; (f) means for heating the midportion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed, and (j) means for shutting off the vacuum to the mid-chamber, opening the mid-chamber to the atmosphere and removing the upper and lower platens from the mid-chamber to permit removal of the packaged product therefrom.

9. Apparatus for forming a package around a product in which there is provided an upper and a lower packaging member one of which is a thermoplastic film disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be moved into sealing condition with the lower surface of the mid-chamber form; (c) an upper platen adapted to mate with the upper sealing surface of the mid-chamber form; (d) said upper platen having an outer adjacent portion provided with a cooling means disposed so as to cool the platen surface adjacent the clamped film; (e) upper and lower packaging members adapted to be moved into sealing condition with the lower member supporting the product and with one of the members being the thermoplastic film; (f) means for heating the midportion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed; and (j) means for shutting off the vacuum to the mid-chamber, opening the mid-chamber to the atmosphere and removing the upper and lower platens from the mid-chamber to permit removal of the packaged product therefrom.

10. Apparatus for forming a package around a product in which there is provided an upper and a lower packaging member one of which is a thermoplastic film disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) said mid-chamber form having a contoured recess formed in one of its ends sized to receive and retain a tray; (c) a lower support platen adapted to be moved into sealing condition with the lower surface of the mid-chamber form; (d) an upper platen adapted to mate with the upper sealing surface of the mid-chamber form; (e) upper and lower packaging members adapted to be moved into sealing condition with the lower member supporting the product and with one of the members being the thermoplastic film; (f) means for heating the midportion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed; and (j) means for shutting off the vacuum to the mid-chamber, opening the mid-chamber to the atmosphere and removing the upper and lower platens from the mid-chamber to permit removal of the packaged product therefrom.

11. Apparatus for forming a package around a product in which there is provided an upper and a lower thermoplastic film packaging member disposed to be heated to a stretchable condition adapted for forming to a product and in which the facing surfaces of the packaging members are conditioned for sealing together by pressure, the apparatus including: (a) a mid-chamber form sized to surround a product of determined size, said form having upper and lower sealing surface ends and a selectively closeable large volume passageway through the wall of the mid-chamber form; (b) a lower support platen adapted to be heated and to move into sealing condition with the lower surface of the mid-chamber form; (c) said lower platen provided with a plurality of insulating members extending above the heated surface; (d) an upper platen adapted to be heated and to mate with the upper sealing surface of the mid-chamber form; (e) upper and lower packaging members adapted to be moved into sealing condition with the lower member supporting the product and with one of the members being the thermoplastic film; (f) means for heating the midportion of one of the platens and drawing the thermoplastic film thereagainst to warm the film to a stretchable condition adapted for forming to a product, and with the facing surfaces of the packaging members conditioned for sealing together by pressure; (g) means for positioning the upper and lower packaging members adjacent the respective upper and lower ends of the mid-chamber form; (h) means for moving the lower and upper platens toward and to the mid-chamber form so as to clamp the upper and lower packaging members at their edges to the mid-chamber form to provide a sealed chamber; (i) means for selectively opening the passageway through the sidewall of the mid-chamber form to a large source of vacuum to rapidly bring the mid-chamber to a condition of reduced pressure and provide a condition of differential pressure against the outer surface of the stretchable film within the clamped edges so that this portion of the film is urged towards and around the product and into sealing engagement with the other packaging member to cause a hermetically sealed package to be formed, and (j) means for shutting off the vacuum to the mid-chamber, opening the mid-chamber to the atmosphere and removing the upper and lower platens from the mid-chamber to permit removal of the packaged product therefrom.

12. Apparatus for forming a package as in claim 11 in which there is provided one mid-chamber form disposed in a fixed position and in which the upper and lower platens are both movable to and from separate thermoplastic film supply means, and in which the platens are provided with means to grip the film as the platens are cycled to bring the films into clamping condition with the fixed mid-chamber form.

13. Apparatus for forming a package around a product in which there is provided upper and lower packaging members of thermoplastic film each fed from a strip to the apparatus and when the package is formed at least one film is heated to a stretchable condition adapted for forming to a product and with the facing surfaces of the packaging members conditioned for sealing together by pressure, the apparatus including:

a. means for supporting and advancing a lower packaging film as a product is placed thereon;
b. a plurality of mid-chamber forms each sized to surround the product being packaged and having a selectively closeable large volume passageway through the wall of the form as the forms are advanced in a determined manner and array;
c. an upper film strip fed to the upper surface of the advancing mid-chamber form;
d. upper and lower platens disposed to be moved into engagement with the mid-chamber form to clamp the upper and lower packaging films to the upper and lower ends of the mid-chamber form to cause a sealed chamber to be formed with the chamber area formed between the upper and lower packaging members;
e. said upper and lower platens having means for heating their central portions and means for cooling their outer portions;
f. said upper and lower platens further each provided with a conduit leading to a selectively controlled source of vacuum and atmosphere and in which small width communication passageways extend from the inner surface of each platen to each conduit;
g. means for heating at least one of the thermoplastic films to a stretchable and heat sealing condition;
h. means for selectively opening the passageway through the sidewall of the mid-chamber form to a large source of vacuum to rapidly bring the mid-chamber to a condition of reduced pressure and provide a condition of differential pressure against the surface of the heated stretchable film within the clamped edges so that this film is urged towards and around the product and into sealing engagement with the lower packaging member to cause a hermetically sealed package to be formed;
i. means for opening the mid-chamber form to the atmosphere;
j. means for removing the upper and lower clamping means from the mid-chamber form;
k. means for trimming the packaged product from the surplus films; and
l. means to accumulate the scrap trimmed from the package.

14. Apparatus for forming a package as in claim 13, in which the mid-chamber form is made as a two-piece member, one portion being U-shaped and with the front closing portion adapted to be moved to and away from the U-shaped portion to permit the packaged product, when severed from the strip of film, to be removed sideways from the U-shaped portion of the mid-chamber.

* * * * *